United States Patent [19]
Azuma et al.

[11] Patent Number: 6,030,326
[45] Date of Patent: Feb. 29, 2000

[54] AUTOMATIC BLADE CHANGING SYSTEM

[75] Inventors: Masayuki Azuma, Mitaka; Tadashi Adachi, Narashino, both of Japan

[73] Assignees: Tokyo Seimitsu Co., Ltd., Tokyo; Seiko Seiki Kabushiki Kaisha, Chiba, both of Japan

[21] Appl. No.: 09/090,229

[22] Filed: Jun. 4, 1998

[30]     Foreign Application Priority Data

Jun. 5, 1997  [JP]  Japan ..................................... 9-148190
May 22, 1998  [JP]  Japan ................................... 10-141306

[51] Int. Cl.$^7$ .................................................. B23Q 3/157
[52] U.S. Cl. ................................ 483/31; 83/666; 483/30; 483/39
[58] Field of Search ..................................... 483/1, 31, 33, 483/38, 39, 30; 83/665, 666, 618, 698.41, 549; 125/15

[56]              References Cited

U.S. PATENT DOCUMENTS 5,637,068  6/1997  Chambers ................................. 483/31
5,778,751  7/1998  Tsuchishima et al. ..................... 83/666
5,839,337  11/1998  Nev .......................................... 83/618

FOREIGN PATENT DOCUMENTS

| 5-59846 | 8/1993 | Japan . |
| 6-262515 | 9/1994 | Japan . |
| 6-326186 | 11/1994 | Japan . |
| 7-17443 | 3/1995 | Japan . |

*Primary Examiner*—William Briggs
*Attorney, Agent, or Firm*—Sixbey, Friedman, Leedom & Ferguson; David S. Safran

[57]               ABSTRACT

An automatic blade changing system of a dicing machine uses a blade which is fixed to an auxiliary stopper member provided with a thread which is engaged with a thread of a spindle. The automatic blade changing system consists of two blade holding means which hold the blade to which the stopper member is fixed and rotate the blade relatively to the spindle in the state wherein the blade is forced to the spindle, a blade accommodating means which accommodates a blade to replace the blade, a moving means for moving the blade holding means between the end of the spindle and the blade accommodating means.

14 Claims, 10 Drawing Sheets

F I G. 2
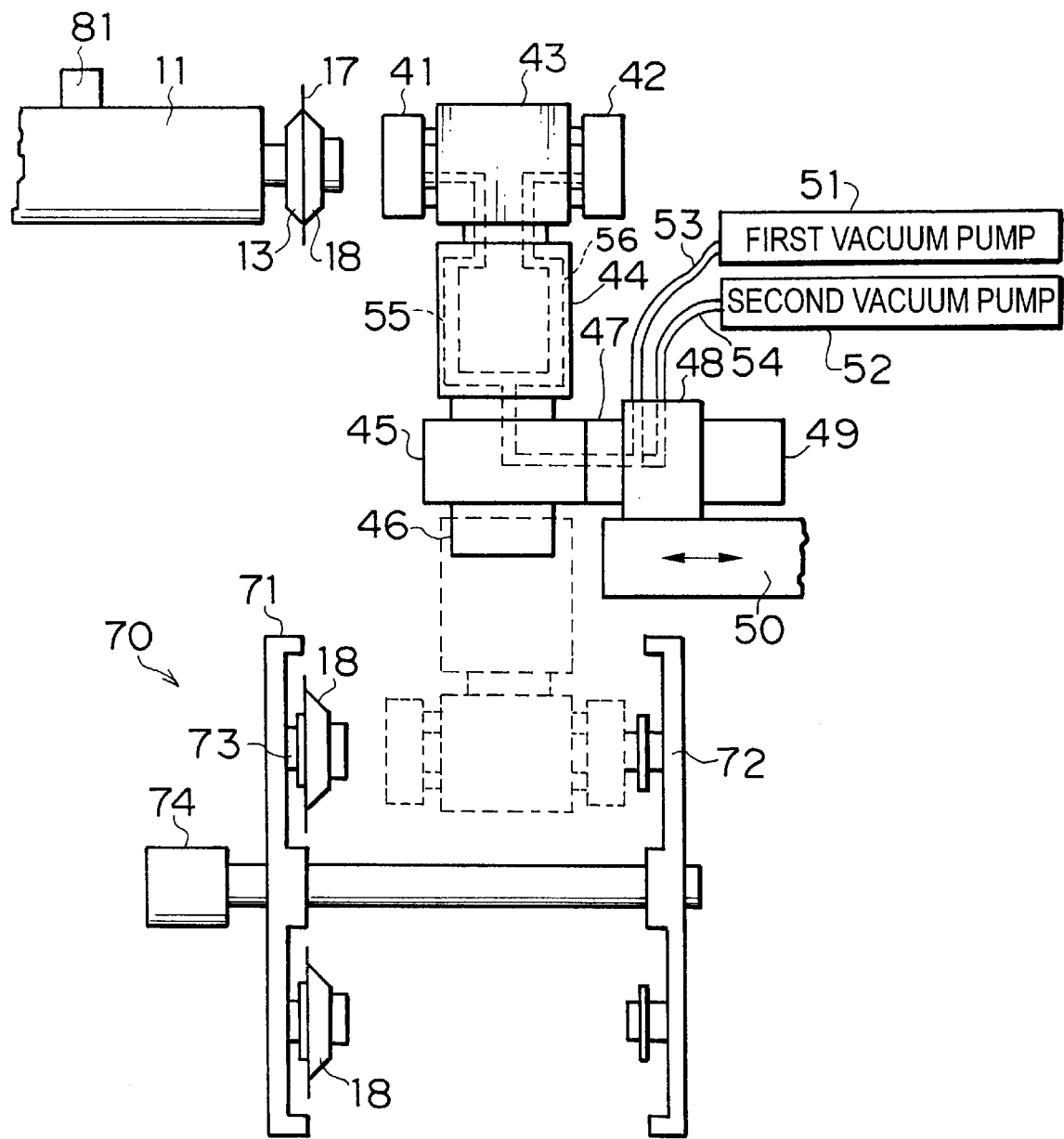

F I G. 3 (A)
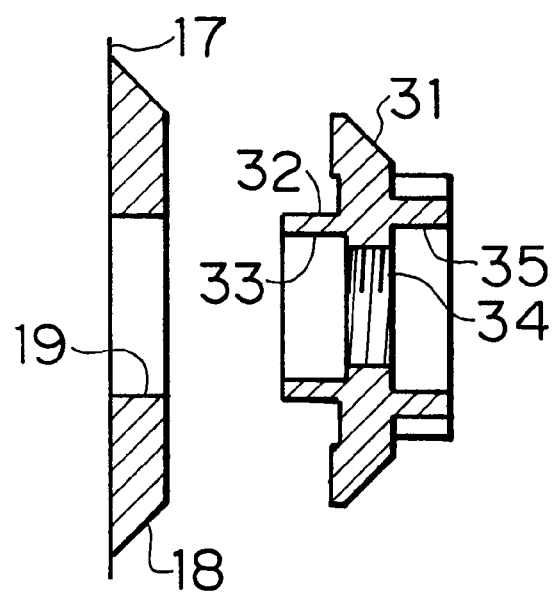
F I G. 3 (B)
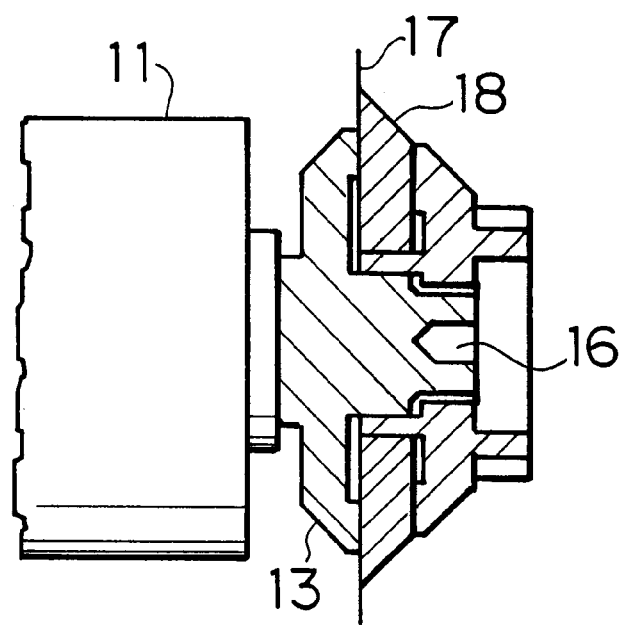

F I G. 5
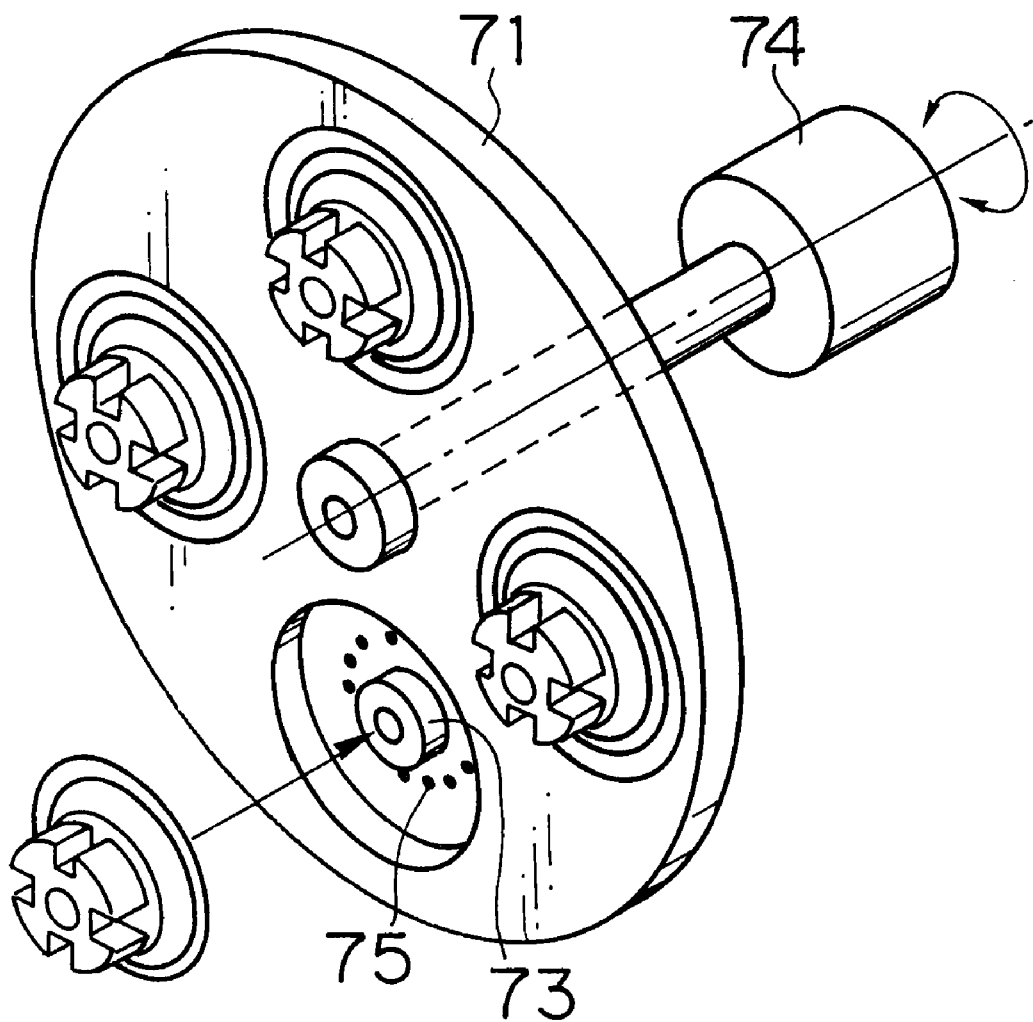

F I G. 10
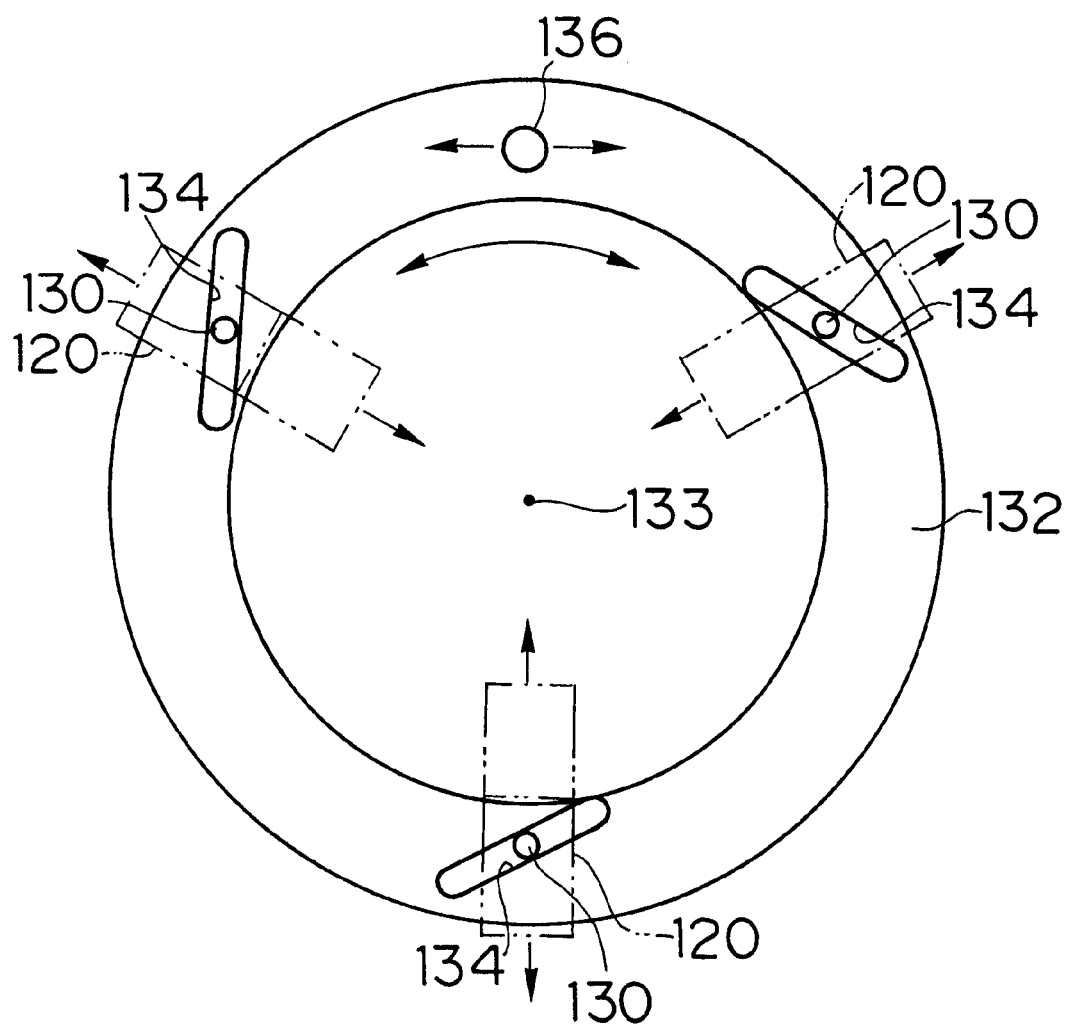

AUTOMATIC BLADE CHANGING SYSTEM

BACKGROUND OF THE INVENTION

1. Field of the Invention

The present invention relates to an automatic blade changing system which automatically changes blades in a dicing machine which dices a semiconductor wafer, etc.

2. Description of Related Art

The dicing machine dices the semiconductor wafer by rotating, at high speed, a thin blade which is made of abrasive grains such as diamond strengthened by nickel, etc. FIG. 1 shows an example of a conventional blade attachment structure in the dicing machine. As shown in FIG. 1, a support 13, an engaging part 14, a thread 15, and a hexagon hole 16 for fixing a spindle 11 are provided at the end of the spindle 11. A blade 17 is fixed to a hub member 18, which is provided with an engaging part 19 which is engaged with the engaging part 14. The blade 17 is pressed in order to come into contact with the support 13 so that the engaging part 14 can be engaged with the engaging part 19. A thread 21 of a nut 20 is engaged with the thread 15. The blade 17 requires the good rotational balance to rotate at ultrahigh speed. The rotational balance of the blade 17 is adjusted in advance with respect to a rotary shaft which is engaged with the engaging part 19, and therefore, the good rotational balance can be obtained by engaging the engaging parts 14 and 19.

The blade becomes worn as cutting proceeds, and it is necessary to replace the blade which has become worn to a predetermined limit. Moreover, blades must be changed in accordance with a change in cutting shapes. Thus, it is necessary to change blades frequently in the dicing machine. To change blades, a hexagon wrench is inserted into a hexagon hole 16 to prevent the rotation of the spindle 11, and the nut 20 is turned and removed. On removal of the hexagon wrench, the nut 20 and the blade 17 are removed. Then, another blade and the nut 20 are attached. The hexagon wrench is inserted into the hexagon hole 16 to prevent the rotation of the spindle, and the nut 20 is turned, threaded into the spindle and fixed. Since it is difficult to automatically change blades, the replacement is currently performed manually.

As part of the labor saving scheme for the dicing machine, workpieces are supplied and collected automatically, and the cutting parts thereof are recognized automatically. The automation is particularly important in the process of manufacturing the semiconductor apparatus since an operator has to supervise a number of dicing machines. As stated above, the manually-performed blade replacement is an obstacle to automation of the dicing operation as a whole.

To solve the above-mentioned problem, Japanese Utility Model Provisional Publication No. 5-59846 and Japanese Patent Provisional Publication No. 6-326186 disclose an automatic blade changer which has a blade attachment and detachment means and a nut attachment and detachment means. They also disclose a blade attachment and detachment means which attaches and detaches an old blade attached to the spindle, and another blade attachment and detachment means which attaches and detaches a new blade which is to be attached to the spindle. Japanese Utility Model Provisional Publication No. 7-17443 discloses an automatic blade changer which is provided with an engagement easing means for heating the blade to facilitate the attachment and detachment thereof. The above-mentioned automatic blade changers, however, have a problem in that the structure is very complex, requires high costs, and the replacement is also complicated, since both of the blade attachment and detachment means and the nut attachment and detachment means have to be provided. Japanese Utility Model Provisional Publication No. 5-59846 and Japanese Patent Provisional Publication No. 6-326186 also disclose the structure in which the blade attachment and detachment means is integrated with the nut attachment and detachment means, but the structure is very complex due to the necessity of providing the two means.

To solve the above-mentioned problems, the applicant of the present invention disclosed in Japanese Patent Provisional Publication No. 6-262515 a blade which is integrated with a thread for attachment. The use of such a blade eliminates the necessity for removing and holding the nut, thus, simplifying the structure of the automatic blade changing system.

The blade of Japanese Patent Provisional Publication o. 6-262515 is completely different from blades which are commonly used. Currently, the standardized blades with equal shape are commonly used for the dicing machine. For this reason, it has been desired to provide, at lower cost, an automatic blade changing system which is able to change blades which are commonly used.

SUMMARY OF THE INVENTION

The present invention has been developed in the above-stated circumstances, and has as its object the provision of an automatic blade changing system which is able to change blades commonly used at low cost.

To achieve the above-mentioned object, the automatic blade changing system attaches and detaches a blade assembly which is constructed in such a way that an auxiliary stopper member provided with a thread engaged with a thread of a spindle shaft is fixed to a standard blade now in common use. The automatic blade changing system is provided with two blade attachment and detachment means: one for holding the blade to be attached and the other for holding the detached blade.

Specifically, the present invention is directed to the automatic blade changing system of a dicing machine which rotates a blade fixed to a spindle shaft at high speed to groove a workpiece, the automatic blade replacing system which automatically replaces the blade, comprising: two blade attachment and detachment means for holding the blade fixed to an auxiliary stopper member which has a thread engaged with a thread of the spindle shaft, blade attachment and detachment means rotating the blade relatively to the spindle shaft in the state wherein the blade is forced to the spindle shaft; a blade accommodating means for accommodating a blade to replace the blade; moving means for moving the blade attachment and detachment means between the end of the spindle shaft and the blade accommodating means; and is characterized in that one of the blade attachment and detachment means holds the blade to be attached, and the other of the blade attachment and detachment means holds the detached blade.

The automatic blade changing system of the present invention uses the standardized blade which are commonly used. The attachment and detachment of the blade assembly provided with the thread eliminates the necessity of separately providing a mechanism which attaches, detaches and holds the thread, and a mechanism which attaches, detaches and holds the blade. It is necessary to provide a mechanism which holds the blade to be attached and a mechanism which holds the detached blade so as to reduce the time required for the back and forth movement between the end of the spindle and the blade accommodating means by half. If there is an additional mechanism which attaches, detaches and holds the thread, the structure is very complicated. According to the present invention, however, the attachment and detachment of the blade assembly eliminates the necessity of providing the mechanism which attaches, detaches, and holds the thread.

According to the present invention, the blade attachment and detachment means hold the blade to which an auxiliary stopper member is fixed. The auxiliary stopper member comprises a positioning member, coupled to the spindle shaft to position the blade on the spindle shaft, and a nut member for fixing the blade on the spindle shaft with use of the positioning member. The blade attachment and detachment means rotate the nut member with respect to the spindle shaft in the state wherein the blade is coupled to the spindle shaft with use of the positioning member. This enables the blade to be fixed to the spindle shaft without rotating the blade or the spindle.

According to the present invention, the blade attachment and detachment means have a plurality of chuck members, and a driving means which moves at least one of the plurality of chuck members forward and backward with respect to the other chuck members, and the driving means moves the chuck member forward to pinch and hold the blade with the plurality of chuck members. The plurality of chuck members pinches and holds the blade steadily. The blade may also be vacuum-held. If, however, there is a gap between a vacuum holding part and the blade, the blade cannot be held steadily. On the other hand, according to the present invention, the blade is pinched and held by the plurality of chuck members, and it is therefore possible to hold the blade steadily.

According to the present invention, the blade attachment and detachment means have a plurality of chuck members and a driving means which moves the plurality of chuck members forward to pinch and hold the blade with the plurality of chuck members, and it is therefore possible to hold the blade steadily.

According to the present invention, the blade consists of a blade body and a hub which is pinched and held by the plurality of chuck members. It is therefore possible to hold the blade without damaging the blade with the chuck members.

According to the present invention, a plurality of chuck members are attached to the cam grooves on the cam member through the cam followers, and a cam driving part drives the cam member such that the plurality of chuck members are guided forward and backward by the cam grooves and the guide members. It is therefore possible to interlock the plurality of chuck members smoothly.

According to the present invention, the blade attachment and detachment means are supported by a support body in a state of floating with support of floating support means. It is therefore possible to attach the blade to the spindle shaft with the displacement of the blade with respect to the spindle shaft being absorbed.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a view illustrating the entire structure of an automatic blade changing system according to an embodiment of the present invention;

FIGS. 3(A) and 3(B) are views illustrating the structure of a blade assembly according to the first embodiment;

FIG. 5 is a view illustrating a blade accommodating mechanism according to the first embodiment of the present invention;

FIG. 10 is a view of assistance in explaining the structure of a chuck member moving mechanism.

DETAILED DESCRIPTION OF THE PREFERRED EMBODIMENT

Figure 1:
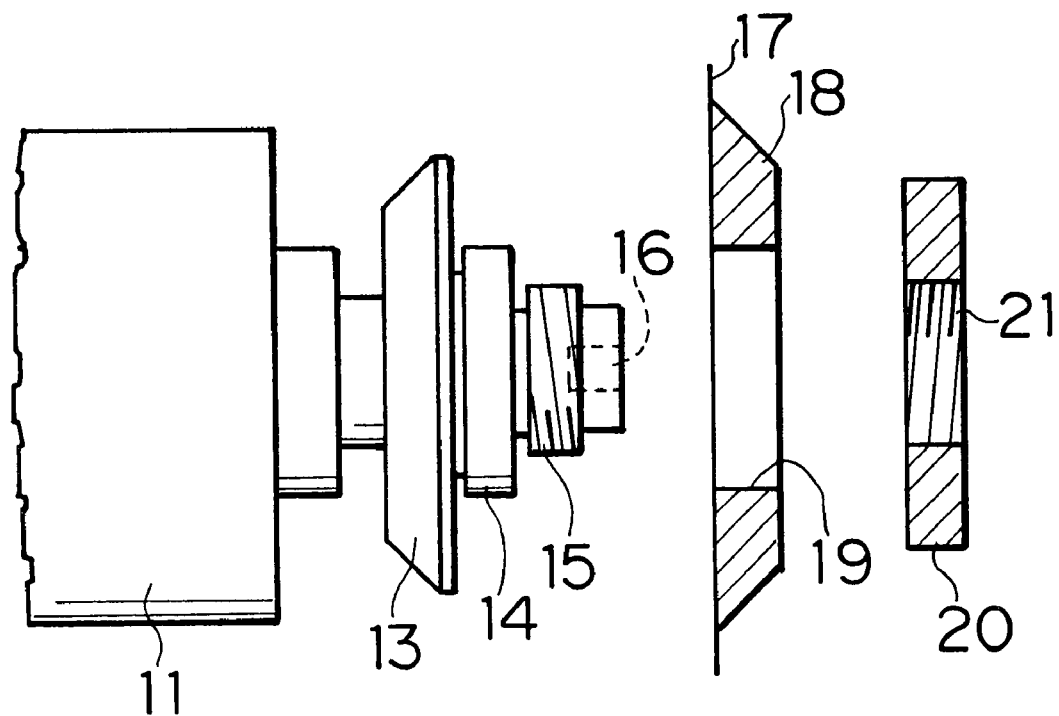
FIG. 1 is a view illustrating a conventional blade attachment mechanism of a dicing machine.

This invention will be described in further detail by way of example with reference to the accompanying drawings.

FIG. 2 shows the entire structure of an automatically blade exchanging system according to the present invention.

In FIG. 2, reference numeral 11 is a spindle, 13 is a support provided on a spindle shaft, 17 is a blade, 18 is a hub, 81 is a vibrometer which is provided on an outer periphery of the spindle 11. Reference numerals 41–56 indicate factors which construct a mechanism attaches and detaches the blade and a mechanism which moves the blade. Reference numeral 70 is a blade accommodating mechanism.

FIG. 3(A) shows a blade and an auxiliary stopper, and FIG. 3(B) shows a blade assembly constructed thereby. As shown in FIG. 3(A), the blade 17 is provided with the hub 18 in order to be attached to the spindle shaft, and the hub 18 is provided with an engaging part 19 and has the standard shape. The auxiliary stopper 31 consists of an engaging part 32 which is fitted into the engaging part 19 under pressure, an engaging part 33 which is fitted into an engaging part of the spindle shaft, a thread 34 which is engaged with a thread of the spindle shaft, and a holding part 35 for attachment and detachment. The blade assembly is constructed in such a way that an auxiliary stopper 31 is fixed to the blade by pressing the engaging part 32 into the engaging part 19 under pressure. In this case, the auxiliary stopper 31 may also be fixed in another method such as threading. The blade assembly is constructed in advance, and the blade is controlled in this manner.

As shown in FIG. 3(B), the blade assembly is attached to the spindle shaft. The engaging part 33 is fitted into the engaging part of the spindle shaft, and the blade assembly is rotated relatively to the spindle shaft to thread the thread 34 into the thread of the spindle shaft. To fix the blade assembly to the spindle shaft, the blade assembly is rotated with the spindle shaft being fixed by a hexagon wrench inserted into a hexagon hole of the spindle shaft, or the hexagon wrench is rotated to rotate the spindle shaft with the blade assembly being fixed. In this embodiment, the hexagon wrench is rotated to rotate the spindle shaft with the blade assembly being fixed. The engaging part 33 and the engaging part of the spindle shaft are tapered, and they can easily be engaged with one another if the blade assembly is pressed in the state wherein the blade assembly can move with some freedom.

Figure 4:
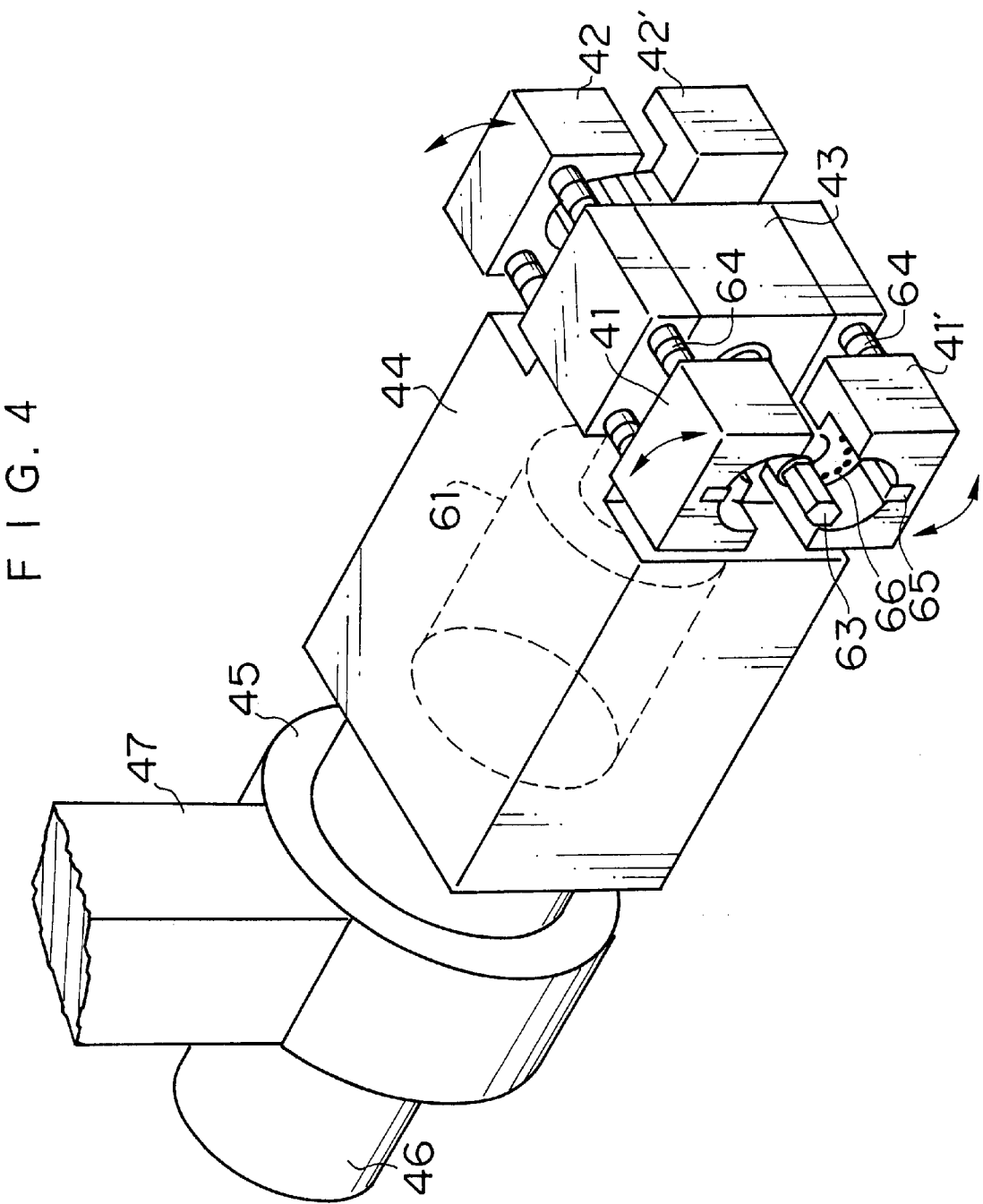
FIG. 4 is a view illustrating a blade assembly attachment and detachment apparatus according to the first embodiment.

FIG. 4 is a perspective view illustrating a blade attachment and detachment apparatus. Reference numerals 41, 41', 42, 42' are attachment and detachment holding members which are fitted into the holding part 35 which is used for attaching and detaching the blade assembly. If the holding part 35 is fitted into frames which are defined by the members 41, 41' and the members 42, 42', the holding part 35 becomes unrotatable. The attachment and detachment holding members 41, 41', 42, 42' are supported by a gear box (a support body) 43 with use of spring holding arms (floating support means) 64, so that they can change their positions and directions to some extent. A hexagon wrench 63 extends from both sides of the gear box 43. The hexagon wrench 63 is rotatable both forward and backward with support of a torque control motor 61, which is provided in the box 44 attached to the gear box 43. The gear box 43 has double shafts, and the hexagon wrenches 63 at both sides thereof rotates at the same time. Reference numeral 66 indicates an area which comes into contact with the top of the auxiliary stopper 31, and holes of a vacuum holding mechanism (a vacuum chuck) are formed in the area 66. The holes are also formed in an area which is defined by the attachment and detachment holding members 42 and 42'. As shown in FIG. 2, the holes of the vacuum chuck connect to vacuum pumps 51, 52 via air pressure passages 55, 56, and hoses 53, 54. By controlling the vacuum pumps 51, 52 independently, it is possible to reduce the pressure of all the holes and absorb and hold the blade assembly.

The box 44 is attached to a rotation mechanism 45, and a motor 46 rotates the box 44. Driving the motor 46 rotates the box 44, and rotates two frames which are defined by the attachment and detachment holding members 41, 41' and 42, 42'. Consequently, the box 44 moves to an opposite position. As shown in FIG. 2, the arm 47 is attached to a rotation mechanism 48, and a motor 49 rotates the arm 47. Running the motor 49 rotates the box 44 and the gear box 43, which move to a position indicated with broken lines in FIG. 2. The rotation mechanism 48 is attached to a direct acting mechanism 50, and the rotation mechanism 48 is capable of moving in a direction indicated with an arrow in FIG. 2.

FIG. 5 shows an accommodating plate 71 of the blade accommodating mechanism. In this embodiment, another accommodating plate 72 is arranged in a manner to face the accommodating plate 71, but it is not illustrated in FIG. 6. the accommodating plate 71 is provided with four shafts 73, which hold four blade assemblies. Holes 75 of the vacuum chuck are formed around the shaft 73, so that the blade assembly can be held without falling off from the accommodating plate 71. There is provided an additional vacuum chuck which reduces the pressure of the holes 75 of the vacuum chuck. The motor 74 rotates the accommodating plate 71.

A description will now be given of the action for changing the blade in the automatic blade changing system according to this embodiment. The blade assembly attached to the spindle shaft is replaced by a new blade assembly which is accommodated in the blade accommodating mechanism. The detached blade assembly is returned to the blade accommodating mechanism. The box 44 and the gear box 43 are placed at a position indicated with broken lines in FIG. 2. First, the accommodating plate is rotated so that a new blade assembly in the blade accommodating mechanism can come to an accessible position. It is possible to use the new blade assembly in any accommodating plate. When the new blade assembly moves to the accessible position, the direct acting mechanism 50 is activated to fit the holding part 35 of the new blade assembly in one of the two frames defined by the attachment and detachment holding members 41, 41' and 42, 42'. When the new blade assembly reaches a predetermined position, the vacuum pump is turned off in an area where the new blade assembly is held in the accommodating plate. The vacuum pump 51 or 52 is activated so as to reduce the pressure of the holes in the frame defined by the attachment and detachment members 41, 41' or 42, 42'. Consequently, the new blade assembly is absorbed and held by the frame defined by the attachment and detachment holding members 41, 41' or 42, 42'.

Then, the direct acting mechanism is activated to separate the frame holding the new blade assembly from the accommodating plate and run the motor 49, which moves the box 44 and the gear box 43 to the positions indicated with solid lines in FIG. 2. When the frame at the spindle shaft side holes the new blade assembly, the motor 46 is run to move the frame holding the new blade assembly to the opposite side of the spindle shaft. For this reason, the frame, which does not hold the blade assembly, is positioned at the spindle shaft side. The direct acting mechanism is activated to fit the holding part of the old blade assembly, which is attached to the spindle shaft, into the frame which does not hold the blade assembly. When the blade assembly moves to a predetermined position, the motor 61 is rotated to turn the hexagon wrench 63 in such a direction as to disengage the thread. This rotates the spindle shaft, but the old assembly does not rotate and the thread comes off since the holding part thereof is fitted in the frame. The old blade assembly moves as the thread is disengaged. For this reason, the direct acting mechanism may be activated to move the frame as the thread is disengaged, or the old assembly may gradually move within the frame as the thread is disengaged. When the thread is disengaged, the vacuum pumps 51 and 52 are activated so that the blade assembly can be absorbed held by the frame without falling off.

Then, the direct acting mechanism is activated to separate the frame from the spindle shaft, and then the motor 46 is run to rotate the frame holding the new blade assembly in a direction to face the spindle shaft. The frame holding the old blade assembly moves to the opposite side of the spindle shaft. Then, the direct acting mechanism is moved to engage the engaging part 33 of the new blade assembly with the engaging part of the spindle shaft. The direct acting mechanism moves until the end face of the blade comes into contact with the surface of the support 13. The engaging part of the spindle shaft and the engaging part 33 of the blade assembly are tapered as stated previously, and the attachment and detachment holding members 41, 41' and 42, 42', which define the frames, are held with use of the spring support arm 64. For this reason, the blade assembly held by the attachment and detachment holding members 41, 41' and 42, 42' can easily be pressed to the spindle shaft. When the blade assembly is pressed to the spindle shaft to a predetermined extent, the end of the thread 34 comes into contact with the thread of the spindle shaft because the spring holding arm 64 is movable in the axial direction. Since the hexagon wrench 63 is fitted into the hexagon hole of the spindle shaft, the spindle shaft rotates when the motor 61 is run to rotate the hexagon wrench 63 in a direction to tighten the thread. The new blade assembly does not rotate and the thread is tightened because it is held by the frame. As the thread is tightened, the vacuum pump for holding the new blade assembly is turned off. As is the case when the old blade is detached, the direct acting mechanism is activated to move the frame with the tightening of the thread of the new blade assembly, or the new blade assembly may move gradually within the frame with the tightening of the thread. The motor 61 is a torque control type motor, and the hexagon wrench 63 becomes unrotatable when the torque increases to some extent after the thread is tightened. At that time, the rotation of the motor 61 is stopped. That completes the attachment of the new blade assembly to the spindle shaft.

The direct acting mechanism is activated to separate the frames from the new blade assembly. If the accommodating plate 72 accommodates the old blade assembly, the positions of the frames are unchanged, but if the accommodating plate 71 accommodates the old blade assembly, the motor 46 is activated to reverse the positions of the frames. Then, the motor 49 is activated to rotate the frames to positions indicated with broken lines in FIG. 2. At the same time, the accommodating plate is rotated so that the position where the old assembly is accommodated can be the accessible position.

The direct acting mechanism 50 is activated to press the old blade assembly into the shaft of the accommodating plate. The vacuum pump for holding the old blade assembly in the frame is turned off, and the vacuum pump connected to the area of the accommodating plate, which holds the old blade assembly, is activated to hold the old blade assembly with the accommodating plate. Then, the direct acting mechanism 50 is activated to separate the frame from the old blade assembly, and the replacement is completed.

Since the blade rotates at ultrahigh speed in the dicing machine as stated previously, the blade requires the good rotational balance, and the engaging part is very accurate. For this reason, there is such a possibility that the blade assembly may not be correctly pressed to the spindle shaft. If the blade rotates in such a state, the spindle can be damaged due to strong vibration. To solve this problem, this embodiment provides the vibrometer 81 in the outer circumference of the spindle. After the replacement of the blade assembly, the spindle rotates so that the vibrometer 81 can detect the vibration state. If the vibration exceeds a predetermined amount, a warning is given. The blade is detached in accordance with the warning, and then the blade is attached again. This prevents the damage on the spindle. The operator may confirm the spindle in accordance with the warning.

The hub of the blade is aluminum, and the auxiliary stopper member 31 is preferably aluminum. In this case, the blade assembly is held in such a method as vacuum chucking as is the case with the above-described embodiment. The vacuum chucking requires vacuum pumps and air pressure passages. Since the vacuum pumps must be large, it is difficult to provide it in an area where something is rotating or moving. As shown in FIG. 2, the vacuum pump must be connected to the holes in the frames. To reduce the replacing time, there must be provided two frames. In this embodiment, since it is necessary to provide two vacuum pumps and two air pressure passages, the passages are complex. If it is necessary to individually provide the blade and the thread unlike the blade assembly of the present invention, there must be additionally provided a mechanism which holds the thread. This results in the necessity of providing additional vacuum pumps and air pressure passages are necessary, and therefore, the air passages are very complex. For this reason, the present invention is very much advantageous.

Figure 6:
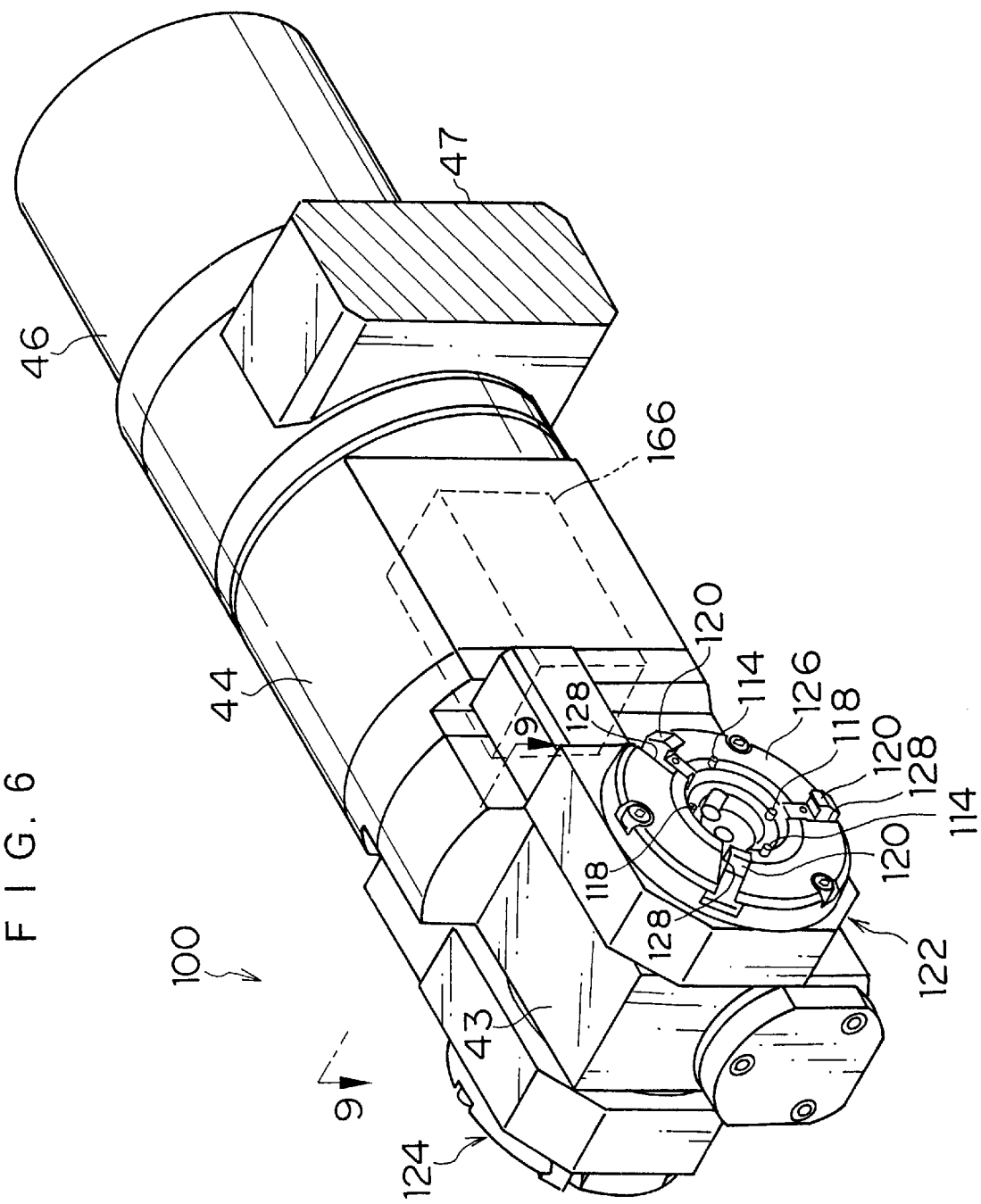
FIG. 6 is a perspective view illustrating a blade assembly attachment and detachment apparatus according to the second embodiment of the present invention.
Figure 7:
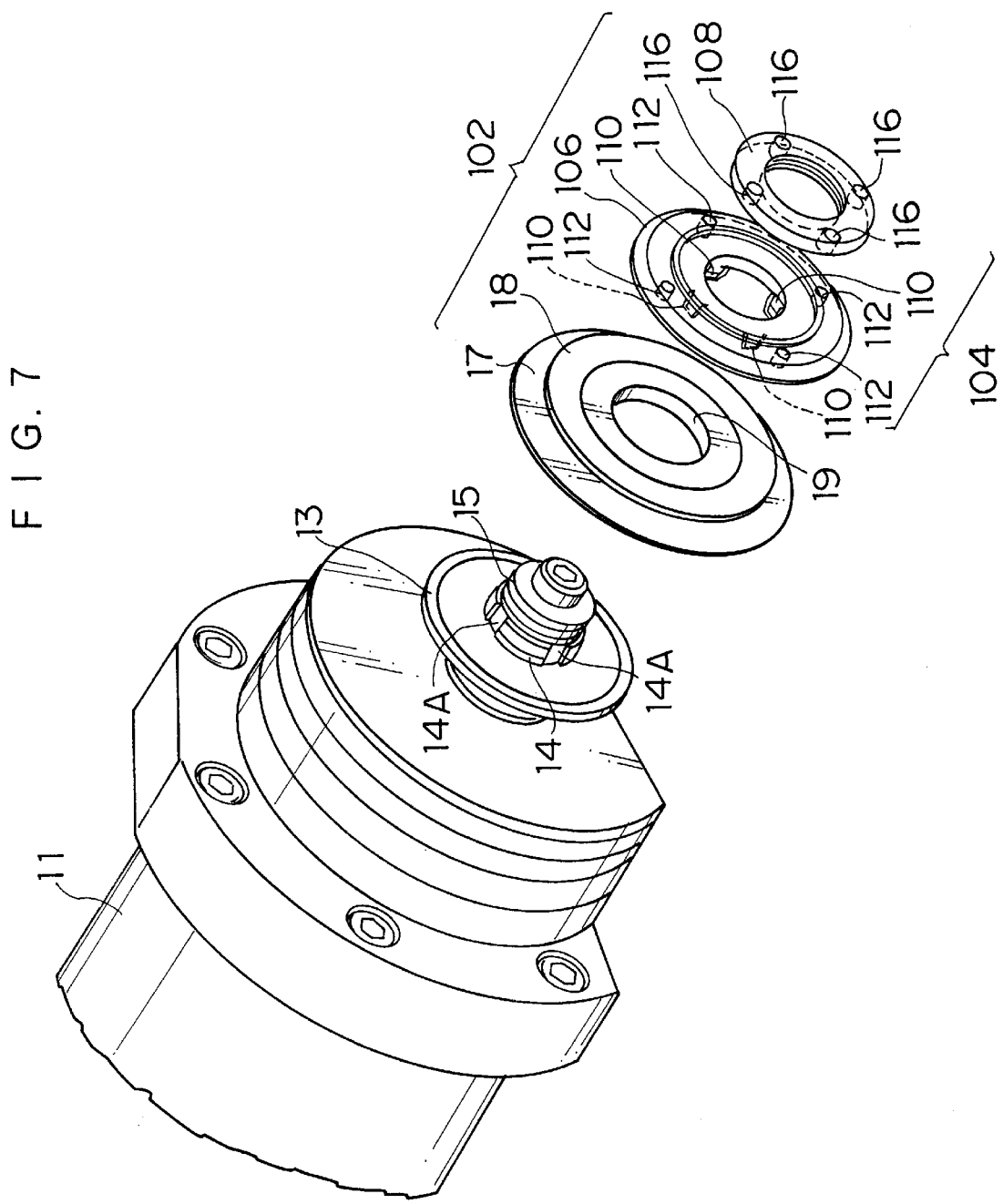
FIG. 7 is a view illustrating the structure of a blade assembly according to the second embodiment.

FIG. 6 is a perspective view illustrating a blade assembly attachment and detachment apparatus 100 according to the second embodiment of the present invention, and FIG. 7 is a perspective view illustrating a blade assembly 102 which is attached and detached by the blade assembly attachment and detachment apparatus 100. Parts similar to those described with reference to FIGS. 1–5 are denoted by the same reference numerals, and they will not be explained.

The blade assembly 102 in FIG. 7 consists of the blade body 17, the hub 18, and an auxiliary stopper member 104. The blade body 17 is fixed to the hub 18. When the engaging part 19 of the hub 18 is engaged with the engaging part 14 at the end of the spindle 11, the blade body 17 is mounted on the spindle 11.

The auxiliary stopper member 104 fixes the blade body 17 to the spindle 11 with use of the hub 18, and it consists of a flange (a positioning member) 106 and a nut (a nut member) 108. The flange 106 is annular, and four clicks 110 are formed on a circle concentric with the flange 106 at 90° intervals on the reverse side of the flange 106. The four clicks 110 project in a direction perpendicular to the flange 106, and the clicks 110 are engaged with the engaging part 19 of the hub 18 and with four grooves 14A (FIG. 7 illustrates two grooves 14A) which are formed at the circumference of the engaging part 14. Thus, according to the blade assembly 102 of this embodiment, it is possible to select four positions where it is fixed to the spindle 11, and the blade assembly 102 can be fixed to the spindle 11 at the best well-balanced position among the four positions.

Circular holes 112 are formed on a circle concentric with the flange 106 at 90° intervals in the surface of the flange 106. Locking pins 114 of the blade assembly attachment and detachment apparatus 100 in FIG. 6 are inserted into the holes 112. The locking pins 114 will be described later.

As shown in FIG. 7, the nut 108 is engaged with the thread 15, which is provided at the end of the spindle shaft 11, in order to bolt the hub 18 to the spindle shaft 11 with use of the flange 106. Circular holes 116 are formed on a circle concentric with the nut 108 at 90° intervals on the surface of the nut 108. Rotating pins 118 of the blade assembly attachment and detachment apparatus 100 in FIG. 6 are inserted into the holes 116. The rotating pins 118 will be described later.

The blade assembly attachment and detachment apparatus 100 is different from the blade assembly attachment and detachment apparatus in FIG. 4 in the blade assembly holding method. Specifically, the apparatus in FIG. 4 holds the blade assembly in a vacuum holding method using the vacuum pumps 51, 52. On the other hand, the apparatus 100 in FIG. 7 pinches the blade assembly with use of chuck members 120. In the method of the apparatus in FIG. 4, the blade assembly cannot be held steadily because it is not held completely if there is a gap between the vacuum holding part and the blade assembly. To the contrary, the method of the apparatus 100 is an advantageous because the blade assembly can be held steadily since the chuck members 140 directly pinch and hold the blade assembly.

A description will be given of the structure of the blade assembly attachment and detachment apparatus 100.

Figure 8:
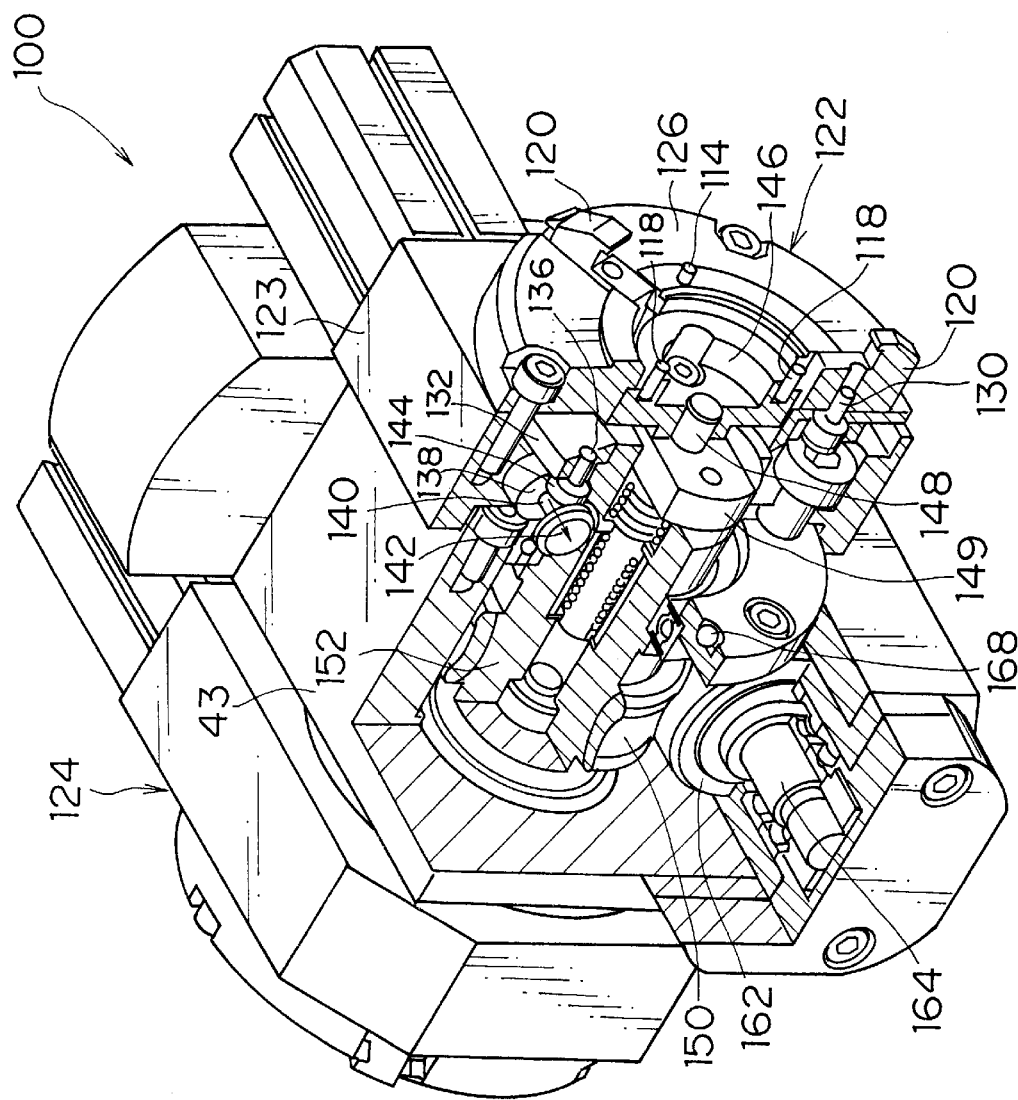
FIG. 8 is a sectional view illustrating the essential parts of the blade assembly attachment and detachment apparatus in FIG. 6.
Figure 9:
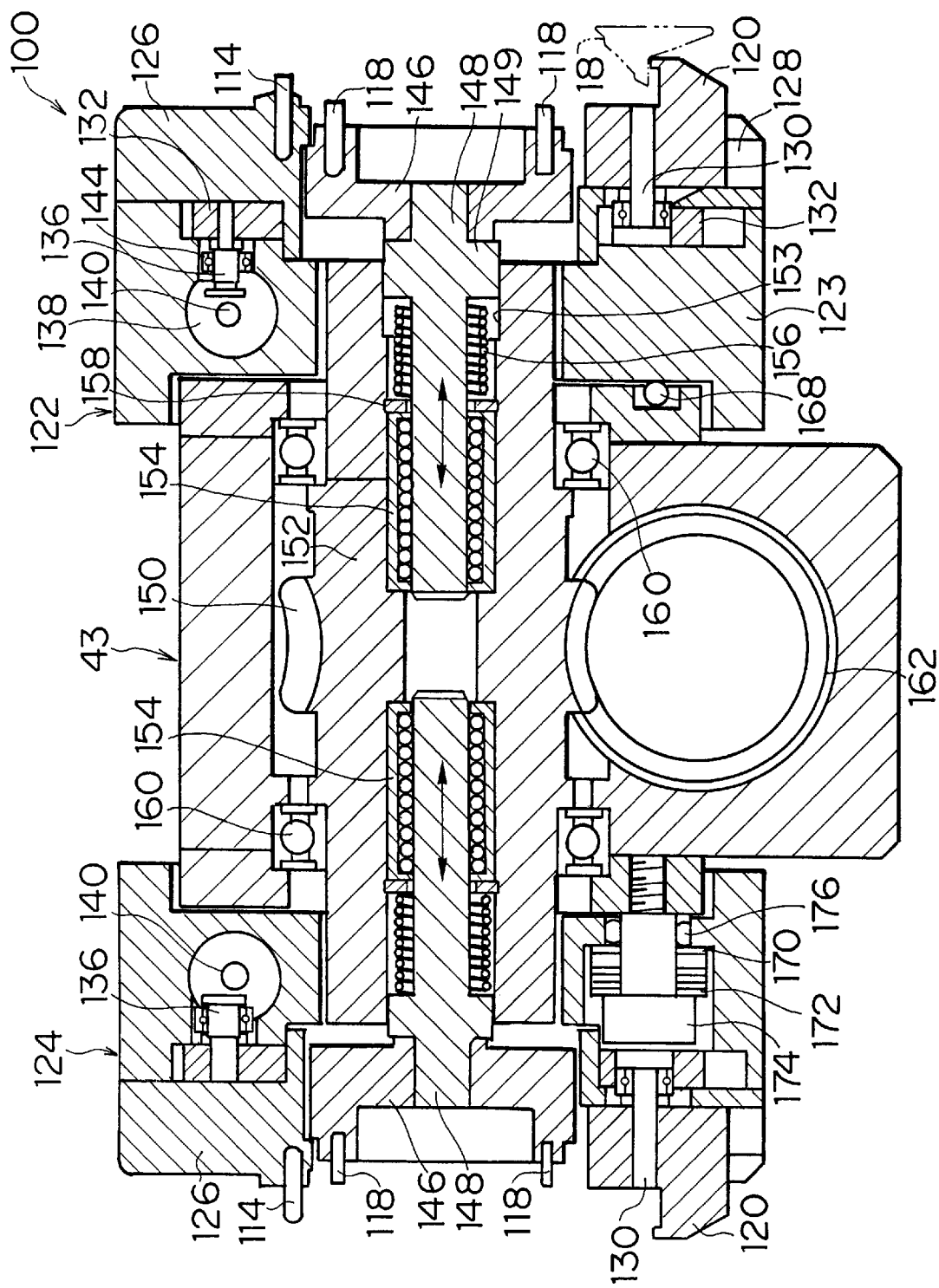
FIG. 9 is a sectional view of the blade assembly attachment and detachment apparatus taken along line 9—9 of FIG. 6.

As shown in FIGS. 6, 8 and 9, the blade assembly attachment and detachment apparatus 100 has chuck apparatuses 122, 124, which are attached at both ends thereof across the gear box 43. Since the chuck apparatuses 122, 124 have the same structure, only the chuck apparatus 122 will be explained. The chuck apparatus 124 will be denoted by the same reference numerals as the chuck apparatus 122.

As shown in FIG. 6, the chuck apparatus 122 has three chuck members 120. The chuck members 120 are arranged on an annular guide plate 126 on a circle concentric with the guide plate 126 in a manner to slide freely on three straight grooves 128 which are formed in the guide plate 126 (see FIGS. 6 and 9). The straight grooves 128 are radially formed around the center of the guide plate 126. Thus, the chuck members 120 are capable of moving forward and backward with respect to the center of the guide plate 126. The guide plate 126 is fixed to the side of a body casing 123 of the chuck apparatus 122, and the locking pins 114 project from the surface of the guide plate 126.

Cam followers 130 in FIG. 10 are attached to the reverse sides of the chuck members 120. The cam followers 130 are respectively coupled to cam grooves 134 which are formed on a cam ring (a cam member) 132. The cam grooves 134 incline in the same direction with respect to the rotating direction of the cam ring 132.

When the cam ring 132 is rotated counterclockwise in FIG. 10 around the center 133 of the cam ring 132, the chuck member 120 is pressed by the cam groove 134 via the cam follower 130. Since the chuck members 120 are arranged in the straight grooves 128 on the guide plate 126, the chuck members 120 move in such directions as to become closer to one another (forward directions). Then, the chuck members 120 pinch and hold the hub 18 of the blade assembly 102 as indicated with an alternate long and two short dashes line in FIG. 9. This prevents the blade from being damaged by the chuck member 120. When the cam ring 132 is rotated clockwise in FIG. 10, the chuck members 120 move in such directions as to become farther from one another, and therefore, the chuck members 120 release the blade assembly 102.

The cam ring 132 is rotatably accommodated in the body casing 123 of the chuck apparatus 122. The cam follower 136 projects from the cam ring 132 as shown in FIGS. 8 and 9. An air cylinder (not shown) is provided in proximity to the cam follower 136. The cam follower 136 is fixed with use of a bearing 144 between a rod 138 of the air cylinder and the stopper 142, which connects to the rod 138 via a connecting bar 140. When the rod 138 of the air cylinder expands, the cam ring 132 is pushed by the cam follower 136 to rotate counterclockwise in FIG. 10. Thus, the blade assembly 102 is pinched and held by the chuck members 120. To the contrary, when the rod 138 of the air cylinder 138 contracts, the cam ring 132 is pulled by the cam follower 136 to rotate clockwise in FIG. 10. Thus, the chuck members 120 release the blade assembly 102. In this embodiment, the air cylinder is used as a driving means for the cam ring 132, but another driving means such as a hydraulic cylinder and a feed thread apparatus may also be used.

On the other hand, a rotary head 146 is provided at the interior of the guide plate 126 as shown in FIGS. 8 and 9. The pins 118 project from the rotary head 146. A rotary shaft 148 is fixed to the rotary head 146 coaxially with the rotary head 146. The rotary shaft 148 is accommodated in a rotary cylinder 152 in which a worm wheel 150 is formed at the circumference thereof. The rotary shaft 148 is inserted into the rotary cylinder 152 via a linear bush 154, and the rotary shaft 148 is supported in such a manner as to freely slide horizontally in FIG. 9. Farther, a spring 156 is inserted into the rotary cylinder 152. One end of the spring 156 is attached to a ring 158 which prevents the linear bush 154 from coming off, and the other end of the spring 156 is attached to a rectangular part 149 of the rotary shaft 148. The rotary head 146 is forced to the right in FIG. 9 by the spring 146. The rectangular part 149 of the rotary shaft 148 is coupled to a rectangular groove 153 formed on the rotary cylinder 152. Since the rotation of the rotary cylinder 152 is transmitted to the rotary shaft 148 via the rectangular grove 153 and the rectangular part 149, the rotary head 146 rotates.

The rotary cylinder 152 is supported by the gear box 43 with use of bearings 160. The worm wheel 150 is engaged with the worm gear 162 in FIG. 8. The worm gear 162 is fixed to a worm shaft 162, which connects to an output shaft of a motor 166 indicated with broken lines in FIG. 6. When the motor 166 is run, the worm gear 162 and the worm wheel 150 reduce the speed of the rotary cylinder 152, and the rotary head 146 rotates as a result.

The chuck apparatus 122 is supported by the gear box 43 at three points with use of three steel balls 168 at one side of the chuck apparatus 122 (FIGS. 8 and 9 illustrate only one steel ball), and it is attached to the gear box 43 with use of a shoulder bolt 174 through an oil free thrust bearing 170 and an initially coned disc spring 172. The chuck apparatus 122 is supported by the shoulder bolt 174 with use of an O-ring 176, and the chuck apparatus 122 is floating. Thus, since the chuck apparatus 122 can slightly move within a plane perpendicular to the rotary shaft 148, it is able to absorb the displacement of the rotary shaft 148 with respect to the blade assembly 102 and the spindle shaft 11.

A description will be given of the operation of the blade assembly attachment and detachment apparatus 100 which is constructed in the above-mentioned manner.

First, an explanation will be given of the operation for replacing the old blade assembly, which is attached to the spindle 11, with the new blade assembly 102. First, the chuck apparatus 122 (or the chuck apparatus 124) is moved towards the spindle 11, and the locking pins 114 of the chuck apparatus 122 are inserted into the holes 112 formed in the flange 106 of the blade assembly 102 to prevent the rotation of the blade assembly 102. Then, the pins 118, which project from the rotary head 146 of the chuck apparatus 122, are inserted into the holes 116 of the nut 108 in the blade assembly 102. The chuck members 120 are moved to become closer to one another, and they tightly pinch and hold the hub 18 of the blade assembly 102. Then, the rotary head 146 is rotated to disengage the nut 108.

The rotary head 146 is pushed by the nut 108 since the nut 108 is disengaged, and the rotary head 146 moves to become farther from the blade 17 against the force of the spring 156. Consequently, the nut 108 is removed from the thread 15.

When the nut 108 is completely removed from the thread 15, the chuck apparatus 122 is moved backward from the spindle 11. As a result, the old blade assembly 102 is detached from the spindle 11 in the stated of being held by the chuck members 120. Then, the chuck apparatus 122 is moved toward the accommodating plate 71 in FIG. 5, and the detached old blade assembly 102 is returned to the shaft 73 of the accommodating plate 71. The detachment of the old blade assembly 102 is completed.

A description will be given of the operation for attaching the new blade assembly 102 to the spindle 11.

First, the chuck apparatus 124 (or the chuck apparatus 122) holds the new blade assembly 102 held by the accommodating plate 71. In this case, the locking pins 114 of the chuck apparatus 124 are inserted into the holes 112 formed in the flange 106 of the blade assembly 102. Then, the pins 118 which project from the rotary head 146 are inserted into the holes 116 of the nut 108 in the blade assembly, and the chuck members 120 are moved to become closer to one another so that the chuck members can steadily pinch and hold the hub 18 of the blade assembly 102. Thus, the chuck apparatus 124 holds the new blade assembly 102.

Next, the chuck apparatus 124 is moved toward the spindle shaft 11, and each click 110 formed on the flange 106 of the blade assembly 102 is engaged with each groove 14A of the spindle 11. The pins 118 which project from the rotary head 146 are inserted into the holes 116 of the nut 108 in the blade assembly 102, and the chuck members 120 are moved to become farther from one another, so that the chuck members 120 release the blade assembly 102. Then, the rotary head 146 is rotated to bolt the nut 108 on the thread 15. At that time, the locking pins 114 of the chuck apparatus 124 locks the blade assembly 102, and therefore, the blade assembly 102 is firmly fixed to the spindle 11. After the blade assembly 102 is fixed to the spindle 11, the chuck 124 is moved backward from the spindle 11. That completes the attachment of the new blade assembly 102.

After the new blade assembly 102 is fixed to the spindle 11, the new blade assembly 102 is rotated by the spindle 11 and the vibrometer 81 detects the vibration of the blade assembly 102. If the vibration detected by the vibrometer 81 exceeds a predetermined value, the new blade assembly 102 is detached from the spindle 11 to change its attachment position with respect to the spindle 11. Then, the new blade assembly 102 is attached to the spindle 11 again. According to the blade assembly 102, it is possible to select four attachment positions.

As stated above, according to the blade assembly attachment and detachment apparatus 100, the chuck members 120 pinch and hold the blade assembly 102 so that the blade assembly 102 can be held steadily.

Moreover, according to the blade assembly attachment and detachment apparatus 100, the chuck members 120 pinch and hold the hub 18 of the blade assembly 102, and therefore, the blade assembly 102 can be held without the chuck members 120 damaging the blade.

Furthermore, according to the blade assembly attachment and detachment apparatus 100, the chuck members 120 are attached to the cam groove 134 through the cam follower 130, and the air cylinder drives the cam ring 132. The chuck members 120 are guided by the cam grooves 134 and the straight grooves 128 of the guide plate, and it is therefore possible to interlock the three chuck members 120 smoothly. The number of chuck members 120 is not necessarily three, but it is desirable to provide three or more chuck members so as to steadily hold the blade assembly 102.

In this embodiment, the three chuck members 120 interlock to pinch and hold the blade assembly, but the present invention should not be restricted to this. At least one of three chuck members 120 is moved to become closer to and farther from the other chuck members 120, so that the three chuck members 120 can pinch the hold the blade.

The blade assembly attachment and detachment apparatus in FIG. 4 may apply the chuck members 120 of the blade assembly attachment and detachment apparatus 100 in FIG. 6 instead of the vacuum chucks.

As set forth hereinabove, the present invention realizes the simple automatic blade changing system using the blade in common use at low cost.

Furthermore, according to the present invention, the blade absorption means is provided with a plurality of chuck members which pinch and hold the blade steadily.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. An automatic blade changing system of a dicing machine which rotates a blade fixed to a spindle shaft at high speed to groove a workpiece, said automatic blade changing system which automatically replaces said blade, comprising:

two blade attachment and detachment means for holding said blade to which an auxiliary stopper member is fixed, said auxiliary stopper member being provided with a thread engaged with a thread of said spindle shaft, said blade attachment and detachment means rotating said blade relatively to said spindle shaft in the state wherein said blade is forced to said spindle shaft;

blade accommodating means for accommodating a blade to replace said blade;

moving means for moving each of said blade attachment and detachment means between the end of said spindle shaft and said blade accommodating means; and wherein one of said blade attachment and detachment means holds the blade to be attached, and the other of said blade attachment and detachment means holds the detached blade.

2. The automatic blade changing system as defined in claim 1, wherein:

said blade attachment and detachment means have a plurality of chuck members, and driving means which moves at least one of said plurality of chuck members forward and backward with respect to the other chuck members; and said driving means moves said chuck member forward to pinch and hold said blade with said plurality of chuck members, and said driving means moves said chuck member backward to release said blade.

3. The automatic blade changing system as defined in claim 2, wherein said blade consists of an annular blade body, and an annular hub to which said blade body is fixed, said hub being pinched and held by said plurality of chuck members of said blade attachment and detachment means.

4. The automatic blade changing system as defined in claim 1, wherein:

said blade attachment and detachment means have a body, a plurality of chuck members arranged on a circle concentric with said body, and driving means for moving said plurality of chuck members forward and backward with respect to the center of said circle; and said driving means moves said plurality of chuck members forward to pinch and hold said blade with said plurality of chuck members, and said driving means moves said plurality of chuck members backward to release said blade.

5. The automatic blade changing system as defined in claim 4, wherein said blade consists of an annular blade body, and an annular hub to which said blade body is fixed, said hub being pinched and held by said plurality of chuck members of said blade attachment and detachment means.

6. The automatic blade changing system as defined in claim 4, wherein said driving means of said blade attachment and detachment means comprises:

a cam member in which a plurality of cam grooves are formed;

cam followers coupled to said plurality of cam grooves in said cam member, said cam followers being respectively provided in said plurality chuck members;

guide members which guide said plurality of chuck members forward and backward with respect to the center of said circle; and a cam driving part which moves said cam member such that said plurality of chuck members are guided forward and backward by said cam grooves and said guide members.

7. The automatic blade changing system as defined in claim 1, wherein said blade attachment and detachment means are supported by support bodies in a state of floating with support of floating support means.

8. An automatic blade changing system of a dicing machine which rotates a blade fixed to a spindle shaft at high speed to groove a workpiece, said automatic blade replacing system which automatically replaces said blade, comprising:

two blade attachment and detachment means for holding said blade to which to an auxiliary stopper member is fixed, said auxiliary stopper member comprising a positioning member, coupled to said spindle shaft to position said blade on said spindle shaft, and a nut member for fixing said blade on said spindle shaft with use of said positioning member, said blade attachment and detachment means rotating said nut member with respect to said spindle shaft in the state wherein said blade is coupled to said spindle shaft with use of said positioning member;

blade accommodating means for accommodating a blade to replace said blade;

moving means for moving each of said blade attachment and detachment means between the end of said spindle shaft and said blade accommodating means; and wherein one of said blade attachment and detachment means holds the blade to be attached, and the other of said blade attachment and detachment means holds the detached blade.

9. The automatic blade changing system as defined in claim 8, wherein:

said blade attachment and detachment means have a plurality of chuck members, and driving means which moves at least one of said plurality of chuck members forward and backward with respect to the other chuck members; and said driving means moves said chuck member forward to pinch and hold said blade with said plurality of chuck members, and said driving means moves said chuck member backward to release said blade.

10. The automatic blade changing system as defined in claim 9, wherein said blade consists of an annular blade body, and an annular hub to which said blade body is fixed, said hub being pinched and held by said plurality of chuck members of said blade attachment and detachment means.

11. The automatic blade changing system as defined in claim 8, wherein:

said blade attachment and detachment means has a body, a plurality of chuck members arranged on a circle concentric with said body, and driving means for moving said plurality of chuck members forward and backward with respect to the center of said circle; and said driving means moves said plurality of chuck members forward to pinch and hold said blade with said plurality of chuck members, and said driving means moves said plurality of chuck members backward to release said blade.

12. The automatic blade changing system as defined in claim 11, wherein said blade consists of an annular blade body, and an annular hub to which said blade body is fixed, said hub being pinched and held by said plurality of chuck members of said blade attachment and detachment means.

13. The automatic blade changing system as defined in claim 11, wherein said moving means of said blade attachment and detachment means comprises:

a cam member in which a plurality of cam grooves are formed;

cam followers coupled to said plurality of cam grooves in said cam member, said cam followers being respectively provided in said plurality chuck members;

guide members which guide said plurality of chuck members forward and backward with respect to the center of said circumference; and a cam driving part which moves said cam member such that said plurality of chuck members are guided forward and backward by said cam grooves and said guide members.

14. The automatic blade changing system as defined in claim 8, wherein said blade attachment and detachment means are supported by support bodies in a state of floating with support of floating support means.

* * * * *